United States Patent [19]

Akao

[11] Patent Number: 4,977,033
[45] Date of Patent: Dec. 11, 1990

[54] PACKAGING MATERIAL

[75] Inventor: Mutsuo Akao, Minami-Ashigara, Japan

[73] Assignee: Fuji Photo Film Co., Ltd., Minami-Ashigara, Japan

[21] Appl. No.: 458,290

[22] Filed: Dec. 28, 1989

[30] Foreign Application Priority Data

Dec. 29, 1988 [JP] Japan .................. 63-332034

[51] Int. Cl.$^5$ .............................. B32B 27/08
[52] U.S. Cl. .................. 428/516; 428/349; 428/500; 428/215
[58] Field of Search ............ 428/516, 215, 500

[56] References Cited

U.S. PATENT DOCUMENTS

| 4,147,291 | 4/1979 | Akao et al. | 429/55 |
|---|---|---|---|
| 4,258,848 | 3/1981 | Akao et al. | 206/524.2 |
| 4,331,725 | 5/1982 | Akao | 428/130 |
| 4,337,285 | 6/1982 | Akao et al. | 428/461 |
| 4,356,224 | 10/1982 | Akao et al. | 428/220 |
| 4,359,499 | 11/1982 | Akao et al. | 428/201 |
| 4,386,124 | 5/1983 | Akao | 428/335 |
| 4,411,943 | 10/1983 | Akao | 428/161 |
| 4,411,945 | 10/1983 | Akao et al. | 428/216 |
| 4,436,809 | 3/1984 | Akao et al. | 430/501 |
| 4,452,846 | 6/1984 | Akao | 428/220 |
| 4,469,741 | 9/1984 | Akao | 428/214 |
| 4,513,050 | 4/1985 | Akao | 428/200 |
| 4,565,733 | 1/1986 | Akao | 428/215 |
| 4,565,743 | 1/1986 | Akao | 428/522 |
| 4,576,865 | 3/1986 | Akao | 428/355 |
| 4,579,781 | 4/1986 | Akao | 428/461 |
| 4,584,234 | 4/1986 | Hirose et al. | 428/323 |
| 4,587,175 | 5/1986 | Akao | 428/596 |
| 4,629,640 | 12/1986 | Akao | 924/216 |
| 4,639,386 | 1/1987 | Akao | 206/316 |
| 4,653,640 | 3/1987 | Akao | 206/455 |
| 4,661,395 | 4/1987 | Akao | 428/461 |
| 4,661,401 | 4/1987 | Akao | 428/215 |
| 4,663,218 | 5/1987 | Akao | 428/212 |
| 4,687,692 | 8/1987 | Akao | 428/220 |
| 4,708,896 | 11/1987 | Akao | 428/349 |
| 4,730,778 | 3/1988 | Akao et al. | 242/68.7 |
| 4,778,712 | 10/1988 | Akao | 428/213 |
| 4,778,713 | 10/1988 | Akao | 428/215 |
| 4,784,906 | 11/1988 | Akao | 428/324 |
| 4,787,506 | 11/1988 | Akao | 206/395 |
| 4,796,823 | 1/1989 | Akao et al. | 242/71.8 |
| 4,844,961 | 7/1989 | Akao | 428/36.92 |
| 4,871,613 | 10/1989 | Akao | 428/328 |
| 4,876,125 | 10/1989 | Akao | 428/35.2 |
| 4,876,129 | 10/1989 | Akao | 428/359 |
| 4,894,264 | 1/1990 | Akao | 428/34.2 |
| 4,903,834 | 2/1990 | Akao | 206/410 |
| 4,906,517 | 3/1990 | Akao | 428/216 |
| 4,925,711 | 5/1990 | Akao . | |

Primary Examiner—Edith Buffalow
Attorney, Agent, or Firm—Burns, Doane, Swecker & Mathis

[57] ABSTRACT

A packaging material which comprises a coextruded multilayer inflation film of which the inner layer is a polyolefin resin film layer containing more than 3 wt. % of an ethylene-α-olefin copolymer resin having a melt index of 0.1 to 20 g/10 minutes (ASTM D-1238), a density of 0.880 to 0.908 g/cm$^3$ (ASTM D-1505) and a molecular weight distribution of more than 4.0, and is adhered through pseudo-adhesion by blocking. In the packaging material of the invention, the polyolefin resin film being the inner layer of the coextruded multilayer inflation film stably adheres irrespective of the temperature variation due to seasons and the variation of manufacturing conditions such as the quantity of cooling air, temperature and the change of film thickness, and the adhered polyolefin resin film layers are not separated. By the pseudo-adhesion by blocking, the physical strength of the packaging material is improved, and curling is made little.

4 Claims, 2 Drawing Sheets

PACKAGING MATERIAL

BACKGROUND OF THE INVENTION

1. Field of the Invention

This invention relates to a packaging material suitable for relatively heavy materials such as a roll film for movie among various photographic photosensitive materials, other photosensitive materials, electric parts and the like.

2. Description of the Prior Art

In general, the packaging materials for photosensitive materials are required to satisfy various properties such as gas barrier, moistureproofness, physical strength such as breaking strength, tear strength, impact puncture strength, Gelbo test strength and wear resistance, heat sealing properties such as heat seal strength, hot tack properties and sealability with other materials, antistatic property, slipping character, low dusting characteristics and flatness, as well as light-shielding ability to shield light completely.

It is difficult to satisfy these properties by a single film material, and heretofore, the packaging materials used were composed of plural layers.

The inventor has investigated for improving packaging materials for photosensitive materials, and for example, disclosed a packaging material of which the physical strength is improved by combining two uniaxially stretched films (U.S. Pat. No. 4,331,725). The inventor also disclosed a laminated film, composed of a foamed sheet having a thickness of 0.3 to 2 mm and an expansion ratio of 5 to 50 times and two uniaxially molecular oriented thermoplastic resin films adhered on the both sides of the foamed sheet by melt adhesion directly or through an extrusion laminating adhesive layer so that respective molecular orientation axes crosses each other at an angle of more than 30 degrees, of which the thickness is reduced to 40 to 85% of the total thickness by pressing (U.S. Pat. No. 4,565,733). The laminated film has a great impact puncture strength and Gelbo test strength and little curling, and it is excellent as a packaging material for heavy products.

However, in these packaging materials composed of plural layers, since each film layer is laminated through an adhesive layer or coextrusion, they are expensive. Moreover, they are stiff due to completely integral joining of each layer, and have a great curling as well as small physical strength. In the case of the laminated films where a coextruded T die film or inflation film is laminated, the laminating cost is expensive, and trimming lose is great.

SUMMARY OF THE INVENTION

An object of the invention is to provide a packaging material capable of generating the adhesion by the blocking between the inner layers all over the surface, irrespective of the temperature variation of the inflation film-molding room through summer and winter, the temperature variation and the quantity variation of cooling air and the thickness change of the inflation film.

Another object of the invention is to provide a packaging material not generating the delamination of the blocking portion nor wrinkling caused by air in the lamination process with a flexible sheet.

The present invention has been made in order to achieve the above objects, and characterized by blending a very low density ethylene-α-olefin copolymer resin into the inner layer of a polyethylene resin film to improve the adhesiveness.

Thus, the packaging material of the invention comprises a coextruded multilayer inflation film of which the inner layer is a polyolefin resin film layer containing more than 3 wt. % of an ethylene-α-olefin copolymer resin having a melt index of 0.1 to 20 g/10 minutes (ASTM D-1238), a density of 0.880 to 0.908 g/cm$^3$ (ASTM D-1505) and a molecular weight distribution of more than 4.0, and is adhered through pseudo-adhesion by blocking.

Figure 1:
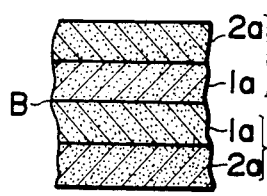
FIG. 1 through FIG. 12 are partially sectional views illustrating layer constructions of the packaging materials embodying the invention.

1,1a ... Inner layer
2,2a ... Outer layer
3,3a ... Coextruded multilayer inflation film layer
4,4a ... Intermediate layer
6,6a ... Adhesive layer
7,7a ... Flexible sheet layer
8,8a ... Heat seal coating layer
9,9a ... Heat seal film layer
10 ... Aluminum layer
a; ... indicating to contain a light-shielding material
B; ... pseudo-adhesion portion.

DETAILED DESCRIPTION OF THE INVENTION

The packaging material of the invention has two polyolefin resin film layers which are the inner layer of a coextruded multilayer inflation film joined by blocking. The polyolefin resin film layers are joined not completely integrally like through an adhesive but pseudo-adhered with a delamination resistance of 0.1 to 150 g/15 mm width, preferably 0.5 to 80 g/15 mm width by blocking in a flexible state to a certain degree without using an adhesive. The pseudo-adhesion portion of the packaging material may optionally be fused by passing through a heating roll of which the surface may be embossed with lattice shape, furrows, cloth shape as well as flat shape.

The polyolefin resin film layer contains an ethylene-α-olefin copolymer resin specified by the melt index (MI, ASTM D-1238), the density (ASTM D-1505) and the molecular weight distribution. The ethylene-α-olefin copolymer is a copolymer of ethylene with an α-olefin such as butene-1, octene-1, hexene-1, 4-methylpentene-1 or heptene-1, and belongs to L-LDPE resin. The MI of the ethylene-α-olefin copolymer resin is 0.1 to 20 g/10 minutes, preferably 0.5 to 10 g/10 minutes. When the MI is less than 0.1 g/10 minutes, the motor load of the screw is great in the inflation film molding machine. As a result, the molding speed loweres, and melt fracture occurs. While, when the MI is beyond 20 g/10 minutes, the physical strength of the film decreases, and draw down occurs. The density of the copolymer resin is 0.880 to 0.908 g/cm$^3$, preferably 0.890 to 0.905 g/cm$^3$. When the density is less than 0.880 g/cm$^3$, draw down occurs. Moreover, even when an antiblocking agent is added, the blocking of pellets occurs, and the intrusion of the resin by the screw is inferior. As a result, the thickness of the film varies, and molding speed loweres. While, when the density is beyond 0.908 g/cm$^3$, the film is thin, and the cooling speed of the molded film is too fast. Particularly, in winter, the adhesion by blocking is uneven, and various troubles occur, such as separation of the pseudo-adhesion portion, entangling of air and wrinkling. Moreover, wrinkling, void, separation and the like also occur in the case of laminating a flexible sheet thereto. The molecular weight distribution (weight average molecular weight ($\overline{M}w$)/number average molecular weight ($\overline{M}n$), measured by gel permeation chromatography) of the copolymer resin is more than 4.0. When the molecular weight distribution is less than 4.0, the motor load of the screw is great. Melt fracture is liable to occur, and the smoothness cannot be secured because the surface is made like fishskin. Blocking is difficult.

The content of the ethylene-α-olefin copolymer resin in the polyolefin resin film layer is more than 3 wt. %, preferably 5 to 90 wt. %, more preferably 10 to 60 wt. %. When the content is less than 3 wt. %, the adhesion by blocking cannot be generated surely at any time.

The resin composing the polyolefin resin film layer may be the ethylene-α-olefin copolymer resin alone, or other resin(s) may be blended. Suitable other resins for blending are high pressure branched low density polyethylene (LDPE) resin, the L-LDPE resin, low, medium pressure medium density polyethylene resin, propylene-ethylene random copolymer resin, propylene-ethylene block copolymer resin, poly(butene-1) resin, poly(4-methylpentene-1) resin, polyisobutylene resin, ethylene-vinyl acetate copolymer resin, ethylene-ethyl acrylate copolymer resin, ethylene-ethyl methacrylate copolymer resin, ethylene-acrylic acid copolymer resin, ionomer resin, modified ethylene copolymer resins, modified polypropylene resins, elastomer resins, tackifier resin and polyvinilidene chloride resin. These resins may be used as a single resin or blended.

When the polyolefin resin film layer is adhered by blocking, a coextruded multilayer inflation film containing the polyolefin resin film layer is pressed by passing the take-up nip roll or a pressure roll or heating roll newly incorporated after the nip roll. The ring dies used for multilayer coextrusion inflation film molding machine are divided broadly into three types, i.e. laminating in die type, laminating out of die type and laminar flow supply type. The laminating in die type is preferable because of strong delamination resistance.

The coextruded multilayer inflation film is composed of two or more layers. Suitable resins composing the other layers are various polyethylene resins, various ethylene copolymer resins, various polypropylene resins, polyvinyl chloride resin, polyvinylidene chloride resin, various polamide resins, polycarbonate resin, various polyester resins and modified polyolefin resins.

One or more films may be laminated to the coextruded multilayer inflaiton film adhered by blocking. The laminating method may be the use of an adhesive or other known laminating methods. Such a film includes metallized films represented by aluminum vacuum-metallized film, cellulose acetate film, cellophane, polyvinyl alcohol film, various papers, various metal foils represented by aluminum foil, nonwoven fabric, and the like.

The film disposed as the outermost layer of the coextruded inflation film is preferably heat-sealable for the convenience for bag-making. A particularly preferred outermost layer is a thermoplastic resin film containing more than 10 wt. % of ethylene copolymer resin, light-shielding material and lubricant. Besides, the softening point (ASTM D-1525) of the outermost layer is preferably higher than the inner layer of the polyolefin resin film layer by 5° C. or more. The statical friction coefficient is preferably less than 0.56 in order to improve the slipping character to prevent wrinkling through the inflation film molding process, the lamination process with other film layers, the bag-making process, the packaging process and the like. The outermost layer must contain no harmful substance for the product to be packaged. While, the polyolefin resin film layer and intermediate layers may contain harmful substances, and regenerated resins and other inexpensive resins are usable for these layers.

The aforementioned polyolefin resin film layer, the thermoplastic resin film layers and the like may contain a light-shielding material in order to secure light-shielding.

The light-shielding material is blendable or dispersible in each layer, and capable of intercepting visible, infrared, ultraviolet and other rays. Examples of the light-shielding materials are described below.

Inorganic Compounds:
Oxides . . . silica, diatomaceous earth, alumina, titanium oxide, iron oxide, zinc oxide, magnesium oxide, antimony oxide, barium ferrite, strontium ferrite, beryllium oxide, pumice, pumice balloon, alumina fiber, etc.
Hydroxides . . . aluminum hydroxides, magnesium hydroxides, basic magnesium carbonate, etc.
Carbonates . . . calcium carbonate, magnesium carbonate, dolomite, etc.
Sulfates, sulfites . . . calcium sulfate, barium sulfate, ammonium sulfate, calcium sulfite, etc.
Silicates . . . talc, clay, mica, asbestos, glass fiber, glass balloon, glass bead, calcium silicate, montmorillonite, bentonite, etc.
Carbons . . . carbon black, graphite, carbon fiber, carbon hollow bead, etc.
Others . . . iron powder, copper powder, lead powder, aluminum powder, molybdenum sulfide, boron fiber, silcon carbide fiber, brass fiber, potassium titanate, lead titanate zirconate, zinc borate, barium metaborate, calcium borate, sodium borate, aluminum paste, etc.
Organic Compounds: wood flour such as pine, oak and sawdust, husk fiber such as almond, peanut and chaff, colored various fibers such as cotton, jute, paper piece, cellophane piece, nylon fiber, polypropylene fiber, starch, aromatic polyamide fiber, etc.

Among them, preferred light-shielding materials make opaque, and light-absorptive carbon black, and graphite are particularly preferred because of being excellent in heat resistance and light resistance and being relatively inactive.

Carbon blacks are divided into gas black, oil furnace black, channel black, anthracene black, acetylene black, Ketchen carbon black, thermal black, lamp black, vegetable black and animal black according to their origin. Among these, furnace carbon black is preferable in terms of light-shielding character, cost and improvement of properties. On the other hand, since acetylene black and Ketschen carbon black have an antistatic character, they are also preferable, though they are expensive. They may be blended to the furnace black in order to improve its character. Particularly preferable carbon black for the packaging material for photographic photosensitive materials is the furnace carbon black having a pH of 6 to 9, a mean particle size of 10 to 120 m$\mu$, a volatile components content of less than 2% and an oil absorption value of more than 50 ml/100 g in view of no occurrence of fogging, rare ocurrence of photosensitivity deviation and great light-shielding ability. Moreover, when it is blended with L-LDPE resin, the lumps of carbon black and fish eyes rarely occur.

A preferable light-shielding material content renders the optical density of the packaging material more than 5. The light-shielding material is preferably incorporated into the inside layer to touch the packaged article in order to make light-shielding more effective. As the form of the light-shielding material, there are powder coloring agent, paste coloring agent, wet coloring agent, masterbatch pellets, dye, colored pellets, etc. Though, there are various blending method, the masterbatch method is preferred in view of cost and the contamination of the working place. Japanese Patent KOKOKU No. 40-26196 discloses a method of making a masterbatch of polymer-carbon black by dissolving the polymer in an organic solvent and dispersing the carbon black into the solution. Japanese Patent KOKOKU No. 43-10362 discloses another method of making a masterbatch by dispersing the carbon black into polyethylene.

To add an antioxidant is preferred in order to prevent coloring troubles and the like. Suitable antioxidants are described below.

Phenol Antioxidants:
6-t-butyl-3-methylphenol derivatives, 2,6-di-t-butyl-p-cresol, 2,2'-methylene bis-(4-methyl-6-t-butylphenol), 2,2'-methylenebis-(4-ethyl-6-t-butylphenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-thiobis(3-methyl-6-t-butylphenol, 4,4'-butylidenebis(3-methyl-6-t-butylphenol), stearyl-$\beta$-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis [methylene-3-(3',5'-di-t-butyl-4'-hydroxyphenyl)propionate]methane, etc.

Ketone-Amine Condensae Antioxidants:
6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:
Phenyl-$\alpha$-naphthylamine, N-phenyl-$\beta$-naphthylamine, N-phenyl-N'-isopropyl-p-phenylenediamine, N,N'-diphenyl-p-phenylenediamine, N,N'-di-p-naphthyl-p-phenylenediamine, N-(3'-hydroxybutylidene)-1-naphtylamine, etc.

Imidazole Antioxidants:
2-mercaptobenzoimidazole, zinc salt of 2-mercaptobenzoimidazole, 2-mercaptomethylbenzoimidazole, etc.

Phosphite Antioxidants:
Alkyl-induced arylphosphite, diphenylisodecylphosphite, sodium phosphite salt of tris(nonylphenyl)-phosphite, trinonylphenylphosphite, triphenylphosphite, etc.

Thiourea Antioxidants:
Thiourea derivatives, 1,3-bis(dimethylaminopropyl)-2-thiourea, etc.

Other Antioxidants:
Those useful for air oxidation, such as dilauryl thiodipropionate, etc.

A suitable content of the antioxidant in the polyolefin resin layer is 0.01 to 2 wt. %. When the content is less than 0.01 wt. %, the blending effect is small. Lumps frequently occur by the yellowing of resin, and they not only degrade the appearance of the packaging material but also induce pressure mark troubles in the case of using for packaging photographic photosensitive materials. While, when the content is beyond 2 wt. %, photographic photosensitive materials utilizing oxidation-reduction reacion is adversely influenced by antioxidant, such as fogging, deviation of photosensitivity and the like. Moreover, the excess antioxidant gradually bleeds out to degrade appearance.

To add a lubricant to each layer is preferred in order to improve film moldability, slipping character and processibility. The lubricants not affecting photographic film adversely are:

Oleic acid amide lubricants; "ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K. K.), "DIAMID O-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants; "BISAMIDE" (Nitto Kagaku K. K.), "DIAMID-200 BIS" (Nippon Kasei Chemical Co., Ltd.), "ARMOWAX-EBS" (Lion Akzo Co., Ltd.), etc.

Silicone lubricants; dimethylpolysiloxanes, etc. (Sinetsu Chemical Co., Ltd., Toray Silicone Co., Ltd.), etc.

Alkylamine lubricants; "ELECTROSTRIPPER TS-2" and "ELECTROSTRIPPER TS-5" (Kao Corp.), etc.

Hydrocarbon lubricants; liquid paraffin, natural paraffin, microwax, synthetic paraffin, polyethylene wax, polypropylene wax, chlorinated hydrocarbon, fluorocarbon, etc.

Fatty acid lubricants; higher fatty acids preferably more than $C_{12}$, hydroxy fatty acids, etc.

Ester lubricants; fatty acid lower alcohol esters, fatty acid polyol esters, fatty acid polyglycol esters, fatty acid fatty alcohol esters, etc.

Alcohol lubricants; polyols, polyglycols, polyglycerols, etc.

Metallic soap; metal salts such as Li, Mg, Ca, Sr, Ba, Zn, Cd, Al, Sn, Pb salts of higher fatty acids such as lauric acid, stearic acid, ricinoleic acid naphthenic acid, oleic acid, etc.

In the case of using the packaging material for packaging photographic photosensitive materials, preferred amount of the lubricant not affecting photographic photosensitive materials adversely is 0.01 to 2 wt. %. Two or more lubricants may be combined. Suitable fatty acid amide lubricants have a number of carbon atoms of 8 to 50, preferably 15 to 35.

A substance having antiblocking activity (antiblocking substance) is preferably incorporated into the outermost film layer. Such an antiblocking substance includes antiblocking agents, such as silica, diatomaceous earth, talc, calcium silicate, aluminum silicate, magnesium silicate, calcium carbonate, polyvinyl esters of higher fatty acid, n-octadecylurea, dicalboxylic acid ester amides and N,N'-dioleylhydroxyamide, and various lubricants and light-shielding materials having antiblocking activity. Preferably antiblocking substances have also light-shielding ability such as carbon black, silica, talc, calcium carbonate, metal powder, titanium dioxide and the like. When the antiblocking substance and the polyethylene resin having a density of more than 0.925 g/cm$^3$ is absent in the outer layer, blocking is liable to occur between the outer layers all over the roll of the inflation film of the invention during winding and temporary stock. Moreover, pellets occur blocking to inhibit smooth drapping from the hopper.

Various additives may be added to the layer polyolefin resin film of the invention. Examples of the additives are described below.

(1) Plasticizer; phthalic acid esters, glycol esters, fatty acid esters, phosphoric acid esters, etc.

(2) Stabilizer; lead compounds, cadmium compounds, zinc compounds, alkaline earth metal compounds, organic tin compounds, etc.

(3) Flame retardant; phosphoric acid esters, phosphoric acid ester halides, halides, inorganic materials, polyols containing phosphor, etc.

(4) Filler; alumina, kaolin, clay, calcium carbonate, mica, talc, titanium dioxide, silica, etc.

(5) Reinforcing agent; glass lobing, metallic fiber, glass fiber, glass milled fiber, carbon fiber, etc.

(6) Blowing agent; inorganic blowing agents (ammonium carbonate, sodium hydrogen carbonate), organic blowing agents (nitroso compounds, azo compounds), etc.

(7) Vulcanizing agent; vulcanization accelerator, acceleration assistant, etc.

(8) Deterioration preventing agent; ultraviolet absorber, metal deactivator, peroxide decomposing agent, etc.

(9) Coupling agent; silane compounds, titanium compounds, chromium compounds, aluminum compounds, etc.

(10) Nucleating agent; organic nucleating agents (dibenzylidene sorbitol compounds, etc.), inorganic nucleating agents (calcium carbonate, etc.)

(11) Various thermoplastic resins, rubbers, etc.

The packaging material of the invention may be used for packaging photosensitive materials such as photographic photosensitive materials, foods, medicines or chemical substances, and it is particularly suitable for packaging silver halide photographic photosensitive materials, diazo photographic photosensitive materials, photosensitive resin photosensitive materials, self-developing type photographic photosensitive materials, diffusion transfer type photographic photosensitive mateials, thermosensitive photographic photosensitive materials, photofixing-type thermosensitive photosensitive materials, transfer-type heat developing photosensitive materials, direct positive type photographic photosensitive materials, ultraviolet curing-type photosensitive materials and other photographic materials which is degraded by little amount of moisture or gas. The packaging material is also suitable for fortified packaging bags for general use, heat insulating sheets, cover films for export and the like.

Package form may be conventional, and includes a single-sheet flat bag, a double-sheet flat bag, a self-standing bag, a single-sheet gusset bag, a double-sheet gusset bag, inner lining for a moisture proof box, inner lining for a light room-loading light-shielding box and a leader paper. The sealing form may also be conventional, and includes heat sealing, heat cut sealing, impulse heat sealing, supersonic sealing and high frequency sealing. The methods of using an adhesive may also be utilized.

In the packaging material of the invention, the polyolefin resin film being the inner layer of the coextruded multilayer inflation film stably adheres irrespective of the temperature variation due to seasons and the variation of manufacturing conditions such as the quantity of cooling air, temperature and the change of film thickness, and the adhered polyolefin resin film layers are not separated. By the pseudo-adhesion by blocking, the physical strength of the packaging material is improved, and curling is made little.

Representative embodiments of the packaging materials of the invention are illustrated in FIGS. 1 to 12.

The packaging material of FIG. 1 is composed of a pair of coextruded multilayer inflation films 3a, 3a consisting of the inner layer which is the polyolefin resin film layer 1a containing a light-shielding material and the outer layer which is a thermoplastic resin film layer 2a containing a light-shielding material. The coextruded multilayer inflation film 3a is molded by a double layer coextrusion inflation film molding machine using a ring die. The inner layers 1a, 1a are joined to each other through the pseudo-adhesion portion B formed by blocking.

Figure 2:
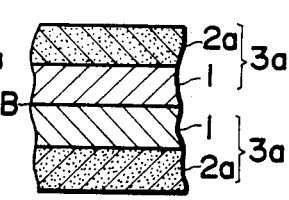

The packaging material of FIG. 2 is the same as the packaging material of FIG. 1, except that the polyolefin resin film layer 1 does not contain a light-shielding material.

Figure 3:
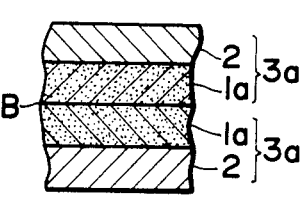

The packaging material of FIG. 3 is the same as the packaging material of FIG. 1, except that the thermoplastic resin film layer 2 does not contain a light-shielding material.

Figure 4:
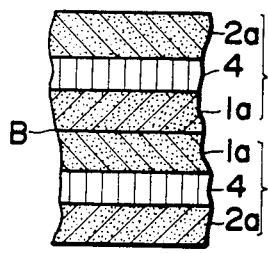

The packaging material of FIG. 4 is the same as the packaging material of FIG. 1, except that the coextruded multilayer inflation film 3a is a triple layer film where an intermediate layer 4 is incorporated.

Figure 5:
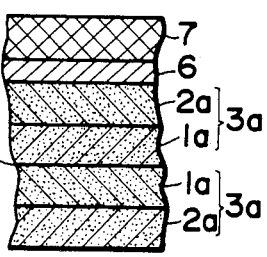

The packaging material of FIG. 5 is the same as the packaging material of FIG. 1, except that a flexible sheet 7 is further laminated through an adhesive layer 6.

Figure 6:
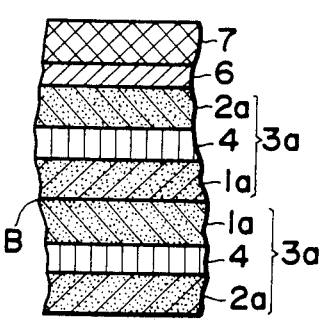

The packaging material of FIG. 6 is the same as the packaging material of FIG. 4, except that a flexible sheet 7 is further laminated through an adhesive layer 6.

Figure 7:
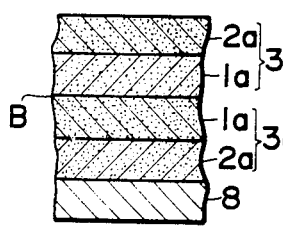

The packaging material of FIG. 7 is the same as the packaging material of FIG. 1, except that a heat seal coating layer 8 is further laminated directly.

Figure 8:
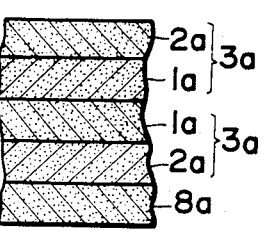

The packaging material of FIG. 8 is the same as the packaging material of FIG. 1, except that a heat seal coating layer 8a containing a light-shielding material is further laminated directly.

Figure 9:
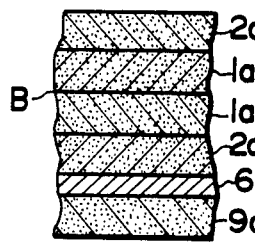

The packaging material of FIG. 9 is the same as the packaging material of FIG. 1, except that a heat seal film 9a containing a light-shielding material is further laminated through an adhesive layer 6.

Figure 10:
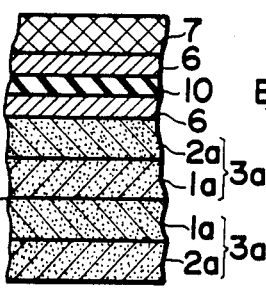

The packaging material of FIG. 10 is composed of the packaging material of FIG. 1, an aluminum layer (aluminum foil or aluminum metallized flexible sheet) 10 laminated thereto through an adhesive layer 6 and a flexible sheet 7 further laminated thereto through an adhesive layer 6.

Figure 11:
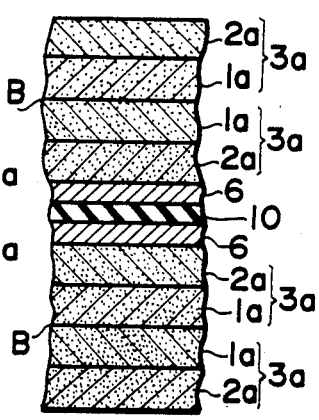

The packaging material of FIG. 11 is the same as the packaging material of FIG. 10, except that the flexible sheet 7 is replaced by the packaging material of FIG. 1.

Figure 12:
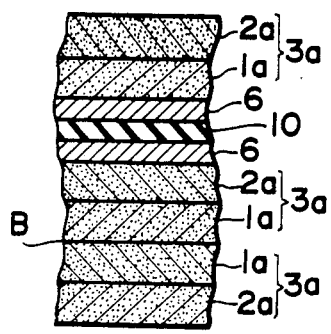

The packaging material of FIG. 12 is the same as the packaging material of FIG. 10, except that the flexible sheet is replaced by a coextruded film 3a composed of the polyolefin resin film layer 1a containing a light-shielding material disposed on the inside and a thermoplastic resin film layer 2a containing a light-shielding material disposed on the outside.

EXAMPLES

Example I

The packaging material of Example I corresponds to the embodiment of FIG. 1.

The thermoplastic resin film layer 2a being the outer layer was composed of 20 wt. % of HDPE resin having a MI of 1.1 g/10 minutes and a density of 0.954 g/cm$^3$, 72.3 wt. % of ethylene-4-methylpentene-1 copolymer resin having a MI of 2.1 g/10 minutes and a density of 0.920 g/cm$^3$, 4.5 wt. % of LDPE resin having a MI of 2.4 g/10 minutes and a density of 0.926 g/cm$^3$ and 3 wt. % of furnace carbon black (using 7.5 wt. % of LDPE resin colored masterbatch containing 40% of carbon black).

The polyolefin resin film layer 1a being the inner layer was composed of 80 wt. % of ethylene-4-methylpentene-1 copolymer resin having a MI of 2.1 g/10 minutes and a density of 0.920 g/cm$^3$, 12.2 wt. % of ethylene-butene-1 copolymer resin having a MI of 5.0 g/10 minutes, a density of 0.902 g/cm$^3$ and a molecular weight distribution of 4.9, 4.5 wt. % of LDPE resin having a MI of 2.4 g/10 minutes and a density of 0.926 g/cm$^3$, 3 wt. % of furnace carbon black (using 7.5 wt. % of LDPE resin colored masterbatch containing 40% of carbon black), 0.1 wt. % of silica, 0.05 wt. % of oleic amide and 0.15 wt. % of antioxidant.

The thickness of the inner layer was made the same as the outer layer, and the thickness of each layer was varied to 10 μm, 15 μm, 20 μm and 25 μm. The four coextruded double layer inflation films were molded using an inflation film molding machine (Placo Co.) at a lay-flat width of 100 cm, a blow-up ratio of 1.3, an outer layer resin temperature of 175° C. and an inner layer resin temperature of 190° C., and pressed by passing a nip roll to adhere the inner layer to obtain the laminated films having a thickness of 40 μm, 60 μm, 80 μm or 100 μm.

Properties of respective laminated films are summarized in Table 1.

Example II

The packaging material of Example II corresponds to the embodiment of FIG. 1.

The laminated films having a thickness of 40 μm, 60 μm, 80 μm or 100 μm were prepared in the same manner as Example I, except that the ethylene-butene-1 copolymer resin of the inner layer was replaced by another ethylene-butene-1 copolymer resin haing a MI of 0.4 g/10 minutes, a density of 0.900 g/cm$^3$ and a molecular weight distribution of 8.3.

Properties of respective laminated films are summarized in Table 1.

Example III

The packaging material of Example III corresponds to the embodiment of FIG. 1.

The laminated films having a thickness of 40 μm, 60 μm, 80 μm or 100 μm were prepared in the same manner as Example I, except that the content of the ethylene-4-methylpentene-1 copolymer resin in the inner layer was changed to 70 wt. % and the ethylene-butene-1 copolymer resin of the inner layer was changed to 22.2 wt. % of the ethylene-butene-1 copolymer resin employed in Example II having a MI of 0.4 g/10 minutes, a density of 0.900 g/cm$^3$ and a molecular weight distribution of 8.3.

Properties of respective laminated films are summarized in Table 1.

Comparative Example I

The packaging material of Comparative Example I corresponds to the embodiment of FIG. 1.

The laminated films having a thickness of 40 μm, 60 μm, 80 μm or 100 μm were prepared in the same manner as Example I, except that the ethylene-butene-1 copolymer resin of the inner layer was replaced by ethylene-4-methylpentene-1 of the same inner layer. As a result, the content of the ethylene-4-methylpentene-1 became 92.2 wt. %.

Properties of respective laminated films are summarized in Table 1.

TABLE 1

|  | Unit | Invention I | | | | Invention II | | | | Invention III | | | | Comparative I | | | |
| --- | --- | --- | --- | --- | --- | --- | --- | --- | --- | --- | --- | --- | --- | --- | --- | --- | --- |
|  |  | I1 | I2 | I3 | I4 | II1 | II2 | II3 | II4 | III1 | III2 | III3 | III4 | C1 | C2 | C3 | C4 |
| Layer Construction |  |  |  |  |  |  |  |  |  |  |  |  |  |  |  |  |  |
| Outer Layer | μm | 10 | 15 | 20 | 25 | 10 | 15 | 20 | 25 | 10 | 15 | 20 | 25 | 10 | 15 | 20 | 25 |
| Inner Layer |  | 10 | 15 | 20 | 25 | 10 | 15 | 20 | 25 | 10 | 15 | 20 | 25 | 10 | 15 | 20 | 25 |
| Inner Layer |  | 10 | 15 | 20 | 25 | 10 | 15 | 20 | 25 | 10 | 15 | 20 | 25 | 10 | 15 | 20 | 25 |
| Outer Layer |  | 10 | 15 | 20 | 25 | 10 | 15 | 20 | 25 | 10 | 15 | 20 | 25 | 10 | 15 | 20 | 25 |
| Total thickness |  | 40 | 60 | 80 | 100 | 40 | 60 | 80 | 100 | 40 | 60 | 80 | 100 | 40 | 60 | 80 | 100 |
| Blocking State | — | B | A | A | A | B | A | A | A | B | A | A | A | EE | E | DC | B |
| Motor Load of Inner layer | A (Ampere) | A 45 | A 56 | B 63 | B 72 | A 61 | B 65 | B 72 | C 78 | A 40 | A 46 | A 53 | A 61 | B 66 | B 72 | C 78 | D 85 |
| Wrinkling streaks | — | C | B | B | B | C | B | B | B | C | B | B | B | E | D | B | B |
| Tear Strength |  |  |  |  |  |  |  |  |  |  |  |  |  |  |  |  |  |
| (MD) | g | 42 | 61 | 123 | 156 | 46 | 72 | 133 | 175 | 52 | 83 | 156 | 184 | 36 | 55 | 106 | 137 |
| (CD) |  | 82 | 98 | 173 | >200 | 91 | 103 | 182 | >200 | 98 | 123 | 191 | >200 | 73 | 88 | 145 | 186 |
| Impact Puncture | kg · cm | 11 | 13 | 18 | 24 | 13 | 16 | 20 | 25 | 15 | 18 | 23 | 27 | 8 | 11 | 16 | 22 |

TABLE 1-continued

| | Unit | Invention I | | | | Invention II | | | | Invention III | | | | Comparative I | | | |
|---|---|---|---|---|---|---|---|---|---|---|---|---|---|---|---|---|---|
| | | I1 | I2 | I3 | I4 | II1 | II2 | II3 | II4 | III1 | III2 | III3 | III4 | C1 | C2 | C3 | C4 |
| Strength | | | | | | | | | | | | | | | | | |

Evaluations in Table 1 were carried out as follows:
A very excellent
B excellent
C practical
D having a problem
E impractical
Testing methods were as follows:
Blocking State: Judged by the blocking strength, the blocking area, expansion of the blocking portion caused by entangled air, wrinkling and streaks collectively.
Wrinkling, Steaks: Visual observation
Tear Strength: According to JIS P-8116
Impact Puncture Strength: According to JIS P-8134

I claim:

1. A packaging material which comprises a coextruded multilayer inflation film of which the inner layer is a polyolefin resin film layer containing more than 3 wt. % of an ethylene-α-olefin copolymer resin having a melt index of 0.1 to 20 g/10 minutes (ASTM D-1238), a density of 0.880 to 0.908 g/cm$^3$ (ASTM D-1505) and a molecular weight distribution of more than 4.0, and is adhered through pseudo-adhesion by blocking.

2. The packaging material of claim 1 of which the adhesive strength by blocking is 0.1 to 150 g/15 mm width.

3. The packaging material of claim 1 of which the outer layer of the coextruded multilayer inflation film is a thermoplastic resin film containing more than 10 wt. % of ethylene copolymer resin.

4. The packaging material of claim 3 wherein the softening point of the outer layer is higher than the inner layer of the polyolefin resin film layer by 5° C. or more.

* * * * *